US011124936B2

(12) United States Patent
Ackles

(10) Patent No.: US 11,124,936 B2
(45) Date of Patent: Sep. 21, 2021

(54) SURFACE CONTAINMENT SYSTEM

(71) Applicant: Gary Ackles, Dawson Creek (CA)

(72) Inventor: Gary Ackles, Dawson Creek (CA)

(*) Notice: Subject to any disclaimer, the term of this patent is extended or adjusted under 35 U.S.C. 154(b) by 0 days.

(21) Appl. No.: 16/789,267

(22) Filed: Feb. 12, 2020

(65) Prior Publication Data
US 2020/0256026 A1   Aug. 13, 2020

Related U.S. Application Data

(60) Provisional application No. 62/805,201, filed on Feb. 13, 2019.

(51) Int. Cl.
| | |
|---|---|
| *C02F 1/40* | (2006.01) |
| *E02B 15/04* | (2006.01) |
| *B63B 35/32* | (2006.01) |
| *E02B 15/06* | (2006.01) |
| *B65D 90/02* | (2019.01) |
| *B65D 90/24* | (2006.01) |
| *F16N 31/00* | (2006.01) |
| *B01D 17/02* | (2006.01) |

(52) U.S. Cl.
CPC ........ *E02B 15/046* (2013.01); *B01D 17/0202* (2013.01); *B63B 35/32* (2013.01); *B65D 90/023* (2013.01); *B65D 90/24* (2013.01); *C02F 1/40* (2013.01); *E02B 15/06* (2013.01); *F16N 31/00* (2013.01)

(58) Field of Classification Search
CPC ... B01D 17/0202; B01D 17/0208; C02F 1/40; E03F 5/10; B65D 90/023; B65D 90/08; B65D 90/24; F16N 31/00

USPC .. 210/170.01, 170.03, 299, 538, 540, 747.1, 210/747.2, 747.3, 799; 220/4.12, 4.16
See application file for complete search history.

(56) References Cited

U.S. PATENT DOCUMENTS

| | | | | |
|---|---|---|---|---|
| 4,592,846 A | * | 6/1986 | Metzger | ................. E02D 31/00 210/170.01 |
| 4,765,775 A | * | 8/1988 | Kroger | .................. B65D 90/24 405/129.8 |
| 5,244,569 A | * | 9/1993 | Di Amico | .......... B01D 17/0208 210/170.01 |
| 5,305,779 A | | 4/1994 | Izaguirre | |
| 5,374,600 A | | 12/1994 | Hozumi et al. | |
| 5,407,575 A | | 4/1995 | Vinsonhaler | |

(Continued)

FOREIGN PATENT DOCUMENTS

CA    2362105    *  2/2002

*Primary Examiner* — Christopher Upton
(74) *Attorney, Agent, or Firm* — Schacht Law Office, Inc.; Dwayne Rogge

(57) ABSTRACT

A surface containment system to contain liquid contaminates escaping from a vessel, the containment system having in one example: a water and oil impermeable barrier liner positioned below the vessel; a perimeter wall surrounding the vessel, the perimeter wall extending vertically from the ground surface and supporting a portion of the barrier liner so as to from a containment reservoir; at least one fluid conduit through the barrier liner, the fluid conduit having a filter configured to retain contaminates and configured to allow water to pass by way of gravity from the reservoir through the impermeable barrier; the perimeter wall formed of a plurality of wall panels connected by way of struts each having a vertical component, a base component anchored to ground.

12 Claims, 6 Drawing Sheets

(56) References Cited

U.S. PATENT DOCUMENTS

| | | | |
|---|---|---|---|
| 5,484,522 A | | 1/1996 | Entrekin |
| 5,935,444 A | * | 8/1999 | Johnson ............. B01D 17/0202 |
| | | | 210/170.03 |
| 6,171,507 B1 | | 1/2001 | Roy et al. |
| 6,966,984 B1 | * | 11/2005 | Solomon ................ B01D 21/02 |
| | | | 210/538 |
| 7,041,213 B1 | | 5/2006 | McClanahan |
| 7,527,738 B2 | * | 5/2009 | Gonzalez .............. F16N 31/002 |
| | | | 210/170.01 |
| 8,137,564 B2 | * | 3/2012 | Gannon ............. B01D 17/0202 |
| | | | 210/747.3 |
| 2004/0118844 A1 | * | 6/2004 | Bennett ................ B65D 90/205 |
| | | | 220/4.12 |
| 2011/0265405 A1 | * | 11/2011 | Ksenych ................ B65D 90/24 |
| | | | 52/264 |
| 2014/0196799 A1 | * | 7/2014 | Hsu ........................ B65D 90/24 |
| | | | 137/312 |
| 2014/0353310 A1 | * | 12/2014 | Perkins .................. B65D 90/24 |
| | | | 220/4.12 |

* cited by examiner

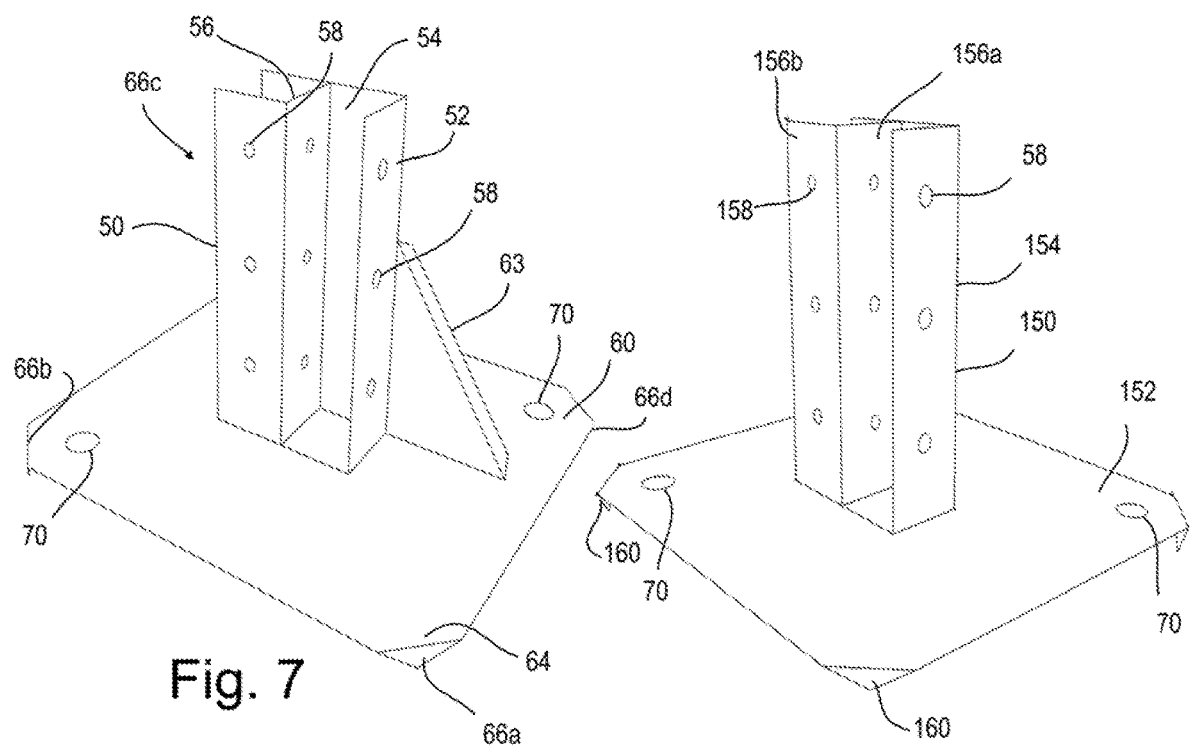
Fig. 7
Fig. 8
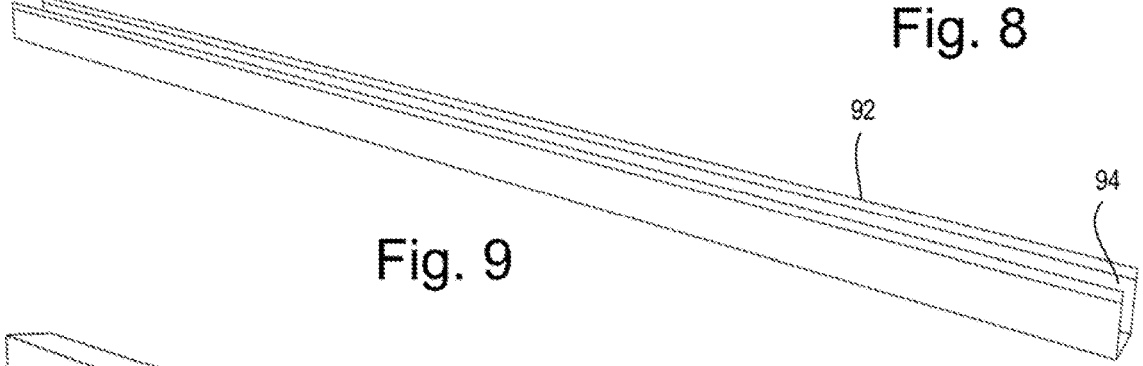
Fig. 9
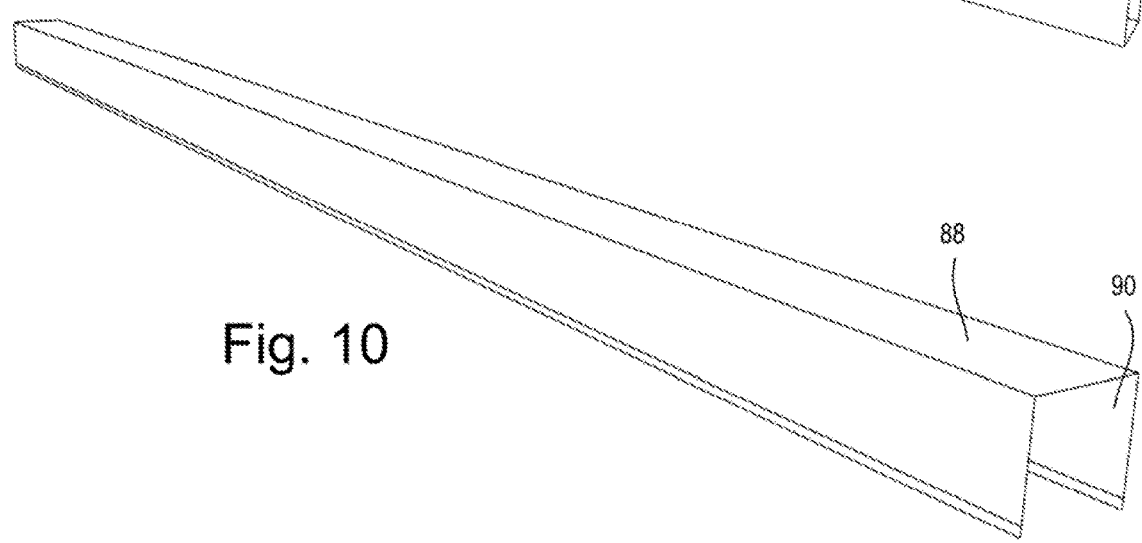
Fig. 10

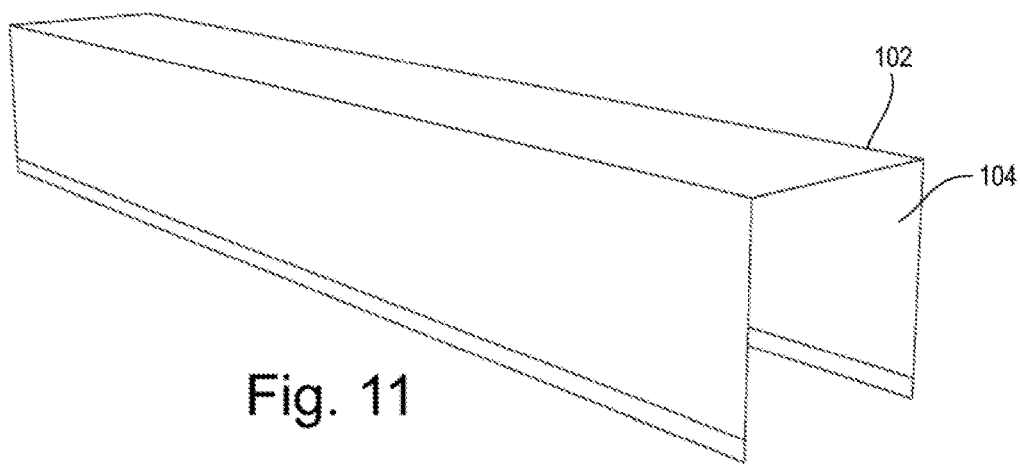
Fig. 11
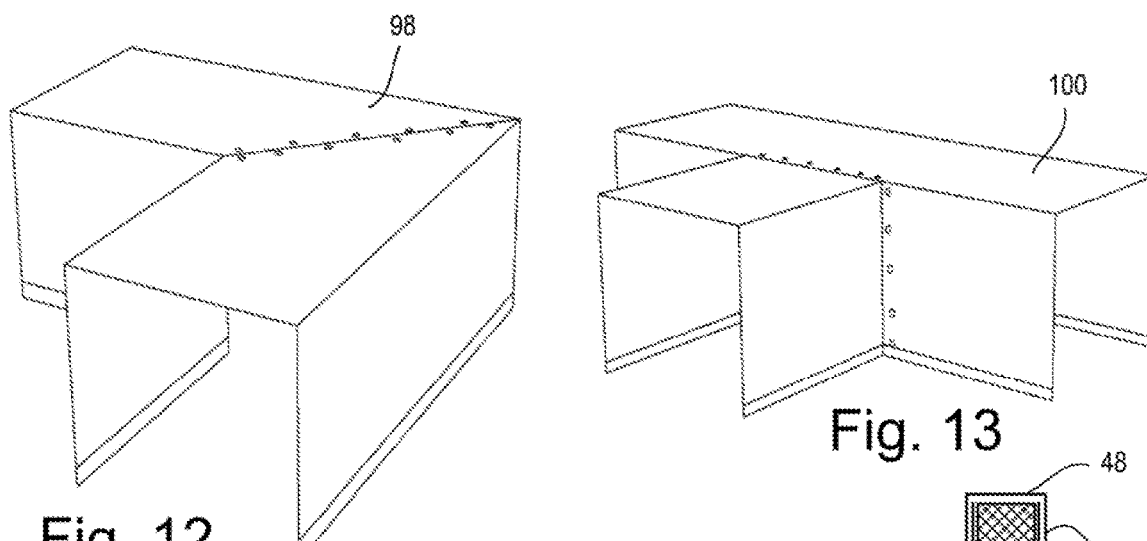
Fig. 12
Fig. 13
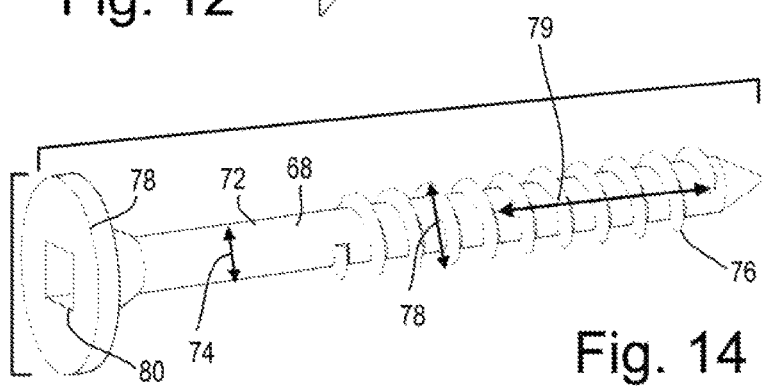
Fig. 14
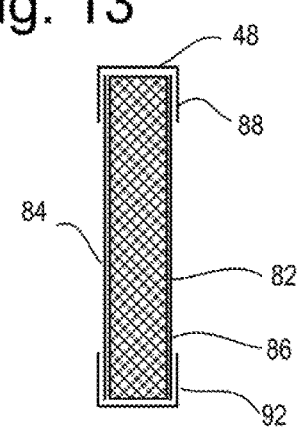
Fig. 15

SURFACE CONTAINMENT SYSTEM

RELATED APPLICATIONS

This application claims priority of U.S. Provisional Patent Application Ser. No. 62/805,201 filed on Feb. 13, 2019 incorporated herein by reference.

BACKGROUND OF THE DISCLOSURE

Field of the Disclosure

This disclosure relates to the field of reservoirs formed below equipment to capture and retain liquids discharged from the equipment to protect the equipment and protect the surrounding environment from contamination. The disclosed apparatus and methods applicable to permanent or transient installations, as well as retrofit equipment support structures including cracked or otherwise inoperable reservoirs.

BRIEF SUMMARY OF THE DISCLOSURE

Disclosed herein are several examples of a surface containment system configured to contain liquid contaminates escaping from a vessel. The containment system comprising in one example: a water and/or oil impermeable barrier liner below the vessel; a perimeter wall surrounding the barrier liner; the perimeter wall extending vertically from the barrier liner and supporting a portion of the barrier liner so as to form a containment reservoir encircling the vessel; at least one fluid conduit through the barrier liner, the fluid conduit comprising a capsule filter or filter wall to allow water to pass by way of gravity from the reservoir through the impermeable barrier; the perimeter wall comprising a plurality of wall panels connected by way of struts; the struts comprising a vertical component connected to the ends of a plurality of wall panels, and a base component anchored to ground; each base component of each strut comprising a ground-engaging corner configured to penetrate the ground and maintain position of the strut; each base component of each strut comprising at least one surface defining a void therethrough, configured to allow passage of the shaft of a ground-engaging anchor and not allow passage of a head of the ground engaging anchor.

BRIEF DESCRIPTION OF THE SEVERAL VIEWS OF THE DRAWINGS

FIG. 7 is a corner-strut component of the example shown in FIG. 4.

FIG. 8 is another corner strut component of the example shown in FIG. 4.

FIG. 9 is a bottom flashing component of the example shown in FIG. 3.

FIG. 10 is a top flashing component of the example shown in FIG. 3.

FIG. 11 is a transition flashing component of the example shown in FIG. 3.

FIG. 12 is a corner flashing component of the example shown in FIG. 1.

FIG. 13 is a tee-flashing component of the example shown in FIG. 1.

FIG. 14 is a ground anchor component of the apparatus disclosed in FIG. 1.

FIG. 15 is a highly schematic cutaway view of one example of a wall panel component shown in FIG. 1.

DETAILED DESCRIPTION OF THE DISCLOSURE

Figure 1:
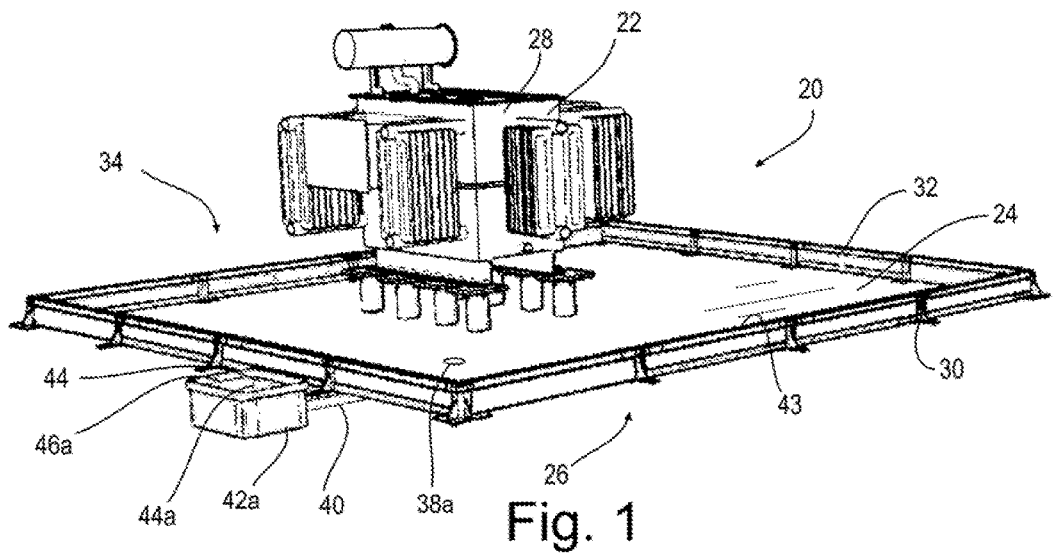
FIG. 1 is an environmental view of an electric substation in place upon/within one example of the disclosed surface containment system.

This disclosure relates to a system utilizing apparatus and methods of protecting the environment from oil spills. The system particularly useful in electric power distribution and generating facilities, mining operations, remediation (reversing or stopping environmental damage), as well as the separation of oil from water in one example using hydrocarbon solidifying polymer blend filter materials.

It is known that when using equipment such as electric power distribution substations, electric power generating stations, mechanical apparatus storage, parking locations for vehicles, tank farms, it is common to control discharge of fluids to the surrounding environment. For ease in description in this disclosure, the term "equipment" will be used to encompass all of these and equivalents. In some applications, such equipment is located near streams or other bodies of water, or in areas where ground contamination would be hazardous to the environment, wildlife, people, other equipment, etc. Such equipment can also be located near underground water reservoirs, exacerbating the problems associated with a spill.

Electrical devices in equipment such as substations (transformers, circuit breakers, regulators, etc.) may contain oils particularly harmful when a leak develops. Many of these oils also contain other hazardous chemicals which pose an additional health, environmental, or equipment hazard. Such equipment is often subject to conditions under which the oil contained in vessels therein may leak into the environment through cracks, or other damage or corrosion. Overheating, age, projectiles, corrosion, lightning strikes, etc. can damage and cause holes in the oil containing vessel, thus spilling oil into the environment.

To control the spread of leaking fluids to the environment, containment basins are often provided vertically below the equipment to contain such spills, such as drip or catch pans. Such basins can fill with rainwater, allowing spilled oil to float on the water and spill beyond the basin to the environment surrounding the equipment. A spill occurring with water in the basin, or a heavy rainfall combined with a spill would result in oil overflowing the walls of the containment basin. A drain valve may be provided, by which the basin can be emptied of water.

Prior known methods of dealing with these problems involve sensors such as capacitance sensors to detect an oil/water interface and thereby drain water or water and oil by opening a valve in the basin. The water or water and oil is then pumped or drained by gravity into a second location. One such system is described in U.S. Pat. No. 5,305,779 to Izaguirre, Apr. 26, 1994, another in U.S. Pat. No. 54,845,622 to Entrekin, May 16, 1994.

Known prior art methods use pipes, valves and pumps to transfer water and spilled oil from several sources into a holding sump and then a second collection sump. Pumps are mechanical devices which are subject to wear, failure, and freezing. If a pump fails when needed, the system can allow oil to flow into the surrounding environment when the volume of the containing reservoir is filled. In addition, valves commonly have small orifices and tortuous paths within them which are subject to clogging with debris, also potentially causing malfunction of the drainage system and flow of oil to the environment.

Known prior art systems commonly use sensors for detecting oil/water interface and controlling water/oil discharge or retain oil within the reservoir or a separate tank or reservoir. Many systems also require power or other flow structures to operate sensors and pumps. This power is most commonly electrical power which may not be available when the equipment fails for example when a substation fails, resulting in the oil discharge from the equipment to the surrounding environment.

Other prior know methods of containing spill involved digging a recessed area below the equipment and installing a rigid (e.g. concrete) catch basin. Often, the location where such equipment lies may have below ground obstructions such as power cables, as well has contaminated ground, neither of which is safe for digging in. Also, concrete is porous, and thus absorbs some of the spilled fluids, making a complete clean-up difficult if not impossible.

Thus, the surface containment system 20 disclosed herein disclosed herein may rest upon an un-excavated ground surface 26 or in a slight or larger excavation. The apparatus may cooperate with a filtering system to filter fluids such that environmentally harmless fluids (e.g. water) flow off and out of the surface containment system 20, while environmentally harmful fluids (hydrocarbons, etc.) are retained by the filtering system and removed for proper disposal.

Looking to FIG. 1 is shown one example of the disclosed surface containment system 20. In this example, the equipment 22 is positioned above a barrier liner 24. The barrier liner 24 may be impermeable to most liquids such as oil, hydrocarbons, and other liquids desired to be retained by the surface containment system 20. The surface containment system 20 also comprises structures configured to allow other liquids (e.g. water) to pass to the environment or a separate retaining structure. In one example, the barrier liner 24 is impermeable to most liquids, or alternatively selectively permeable at ambient temperatures between −40° C. and 180° C., within a normal environmental temperature. In one example, the barrier liner 24 is comprised of a polymer or multi polymer material providing sufficient strength to hold up to use, flexibility to conform to the underlying ground surface 26, and chemical resistance to corrosives, while providing an impermeable barrier or selectively permeable barrier while providing chemical resistance to corrosives. In one example, the barrier liner 24 is formed of polyvinyl. While the barrier liner 24 may be made of varying materials and thicknesses, one example of the barrier liner 24 in one range is between 6 mils (0.006") to 250 mils (0.250") thick. In a narrower range, the barrier liner is between 20 and 50 mils thick. The thickness selected to allow conformity to the ground surface 26 upon which the barrier liner 24 is positioned, optionally support the equipment 22 and any other items which threaten to damage the barrier liner 24, and stand up to environmental deterioration and damage as the barrier liner 24 may be used outdoors and thus subjected to the elements including sun, rain, snow, sleet, heat, cold, etc. as well as personnel walking on the barrier liner 24, possibly equipment standing on or moving on the equipment, animals such as rabbits and moles for example, etc.

Figure 2:
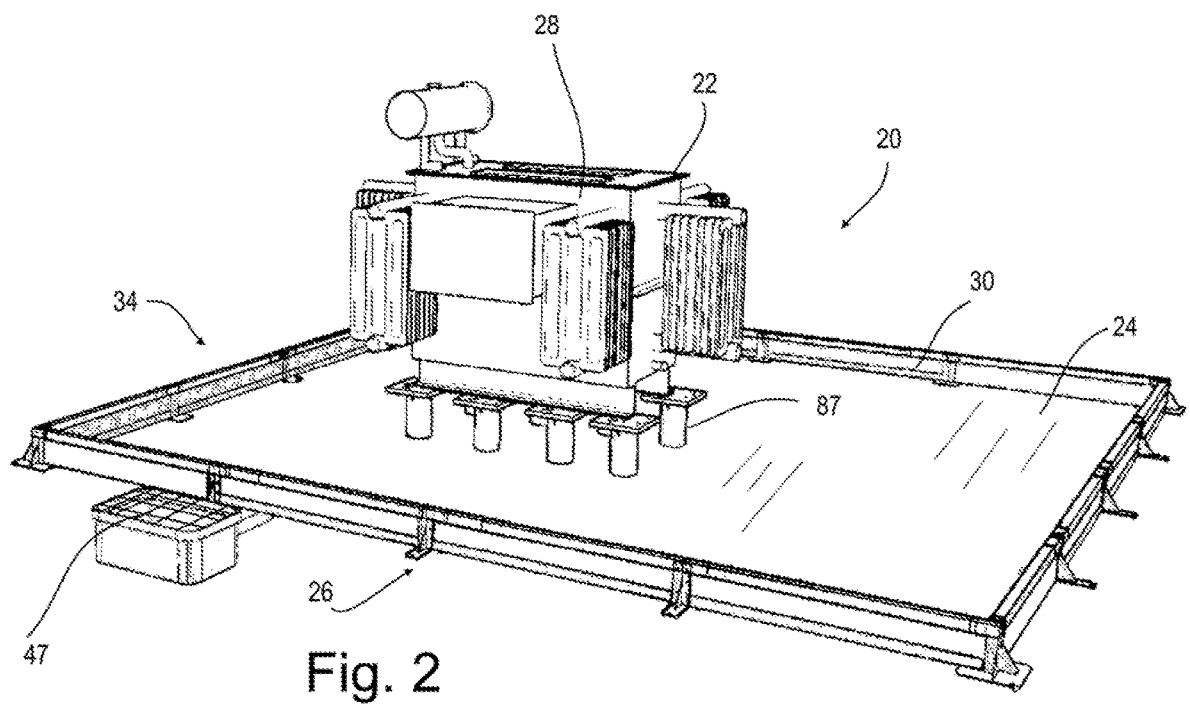
FIG. 2 is another example of the disclosed surface containment system.
Figure 4:
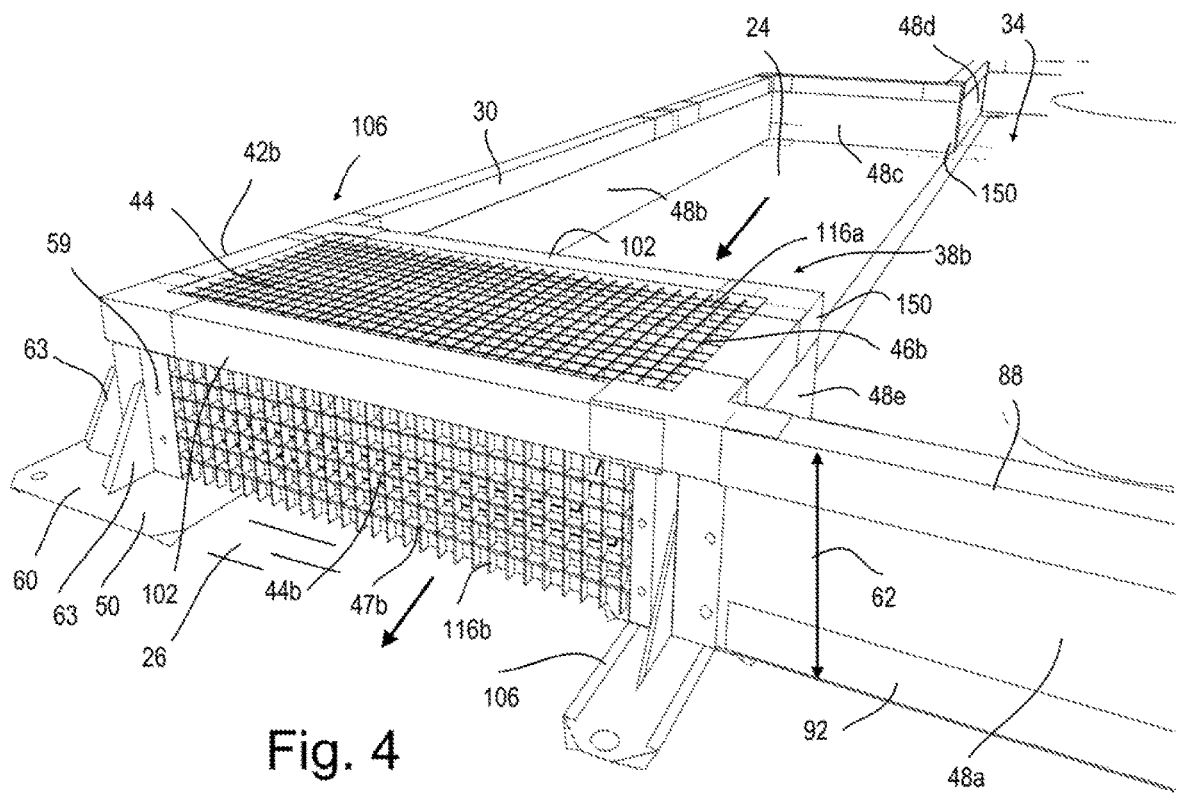
FIG. 4 is an enlarged view of a corner region of the disclosed surface containment system.

In one example shown in FIG. 4, the reservoir 34, discharge housing 42b, and discharge grate 47b are positioned above the ground surface 26. The filter 44 may be positioned within the discharge housing 42b to collect and retain hydrocarbons or other hazardous fluids flowing from the reservoir 34. In the example of FIG. 1 and FIG. 2, the reservoir 34 is above ground, with a connecting pipe 40 and discharge housing 42a below ground, with the outlet (discharge) grate 47a substantially at ground level. Three filter systems are envisioned, each may be incorporated with these systems.

Capsule filter. These types of filters are well known in potable water filtration systems where a removable in-line filter is provided, for example in the connecting pipe 40 or in the downstream end of the connecting pipe 40 where it is connected to the discharge housing 42a. Such cartridge filters generally include a rigid cartridge housing, removable fluid connector(s) and an oleophilic or hydrocarbon solidifying filter material within the housing keeps hydrocarbons from passing through the cartridge, while allowing water to pass through. One such material is disclosed in U.S. Pat. No. 5,374,600A.

Figure 16:
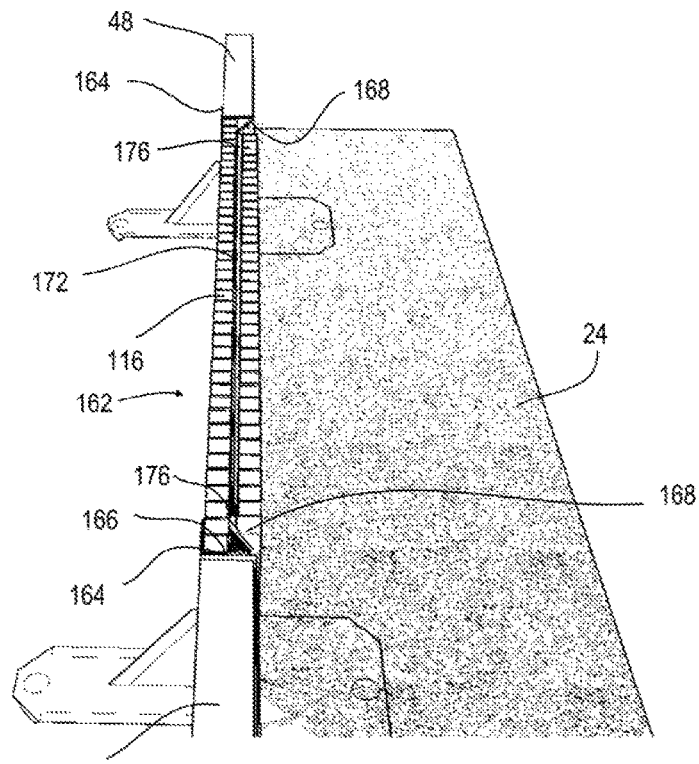
FIG. 16 is an isometric enlarged view of a prefilter region of the example shown in FIG. 1

Barrier filter (filter wall). One such barrier wall filter for example as shown in FIG. 16.

Sorbent or hydrocarbon solidifying filter. One such filter is disclosed in U.S. Pat. No. 5,407,575A. Filters of these sort may be used by placing the filter in the filter housing and as the precipitation and contaminates contact the filter, they are collected or solidified and thus do not pass through the exit grate to the environment.

In one example, the filter comprises a multi-blend polymer hydrocarbon solidifying filter.

By providing the barrier liner 24 as a thin film, it may be rolled, folded, or a combination thereof for storage and/or transport. When used in combination with a modular perimeter wall 30, the overall surface containment system 20 may be easily transported to a needed site, set up with little or no ground preparation, and then removed with little or no residual impact on the environment. Below ground, concrete, and other permanent structures are more involved to install, and result in significant impact to the environment.

FIG. 1 shows the equipment 22 positioned above the barrier liner 24. The equipment 22 of this example comprises one or more tanks 28 housing hydrocarbons such as oil or other liquid chemicals. Thus, any rupture of the tank(s) 28 or leakage of these liquids from the tank 28 will flow likely onto the barrier liner 24 and be retained by the barrier liner 24.

When a substantial volume of liquid spills from the tank 28, or when the spilled liquid combines with a volume of other fluid, such as water (precipitation, snow, rain, hail, frost) the volume of liquid retained by the barrier liner 24 may be increased by additional structures. For example, it may be desired that the barrier liner 24 is sealed to or is extended vertically upwards by a vertically extending perimeter wall 30. In the example shown, it can be seen that the barrier liner 24 is substantially at the ground surface 26 of the surrounding environment, with the perimeter wall 30 extending vertically upwards therefrom. The barrier liner 24 in one example is sealed to the perimeter wall 30. Alternatively, the barrier liner 24 has a perimeter portion 32 supported in a vertical plane above the ground 26. The barrier liner 24 and perimeter wall 30 thus forming a reservoir 34 with an increased volume over a substantially planar barrier liner 24. For these reasons, it will generally be desired that the volume of the reservoir 34 is greater than the (combined) volume of the tank(s) 28 of the equipment 22. In this calculation, precipitation may also be considered along with the frequency at which the equipment is checked for leakage or sensors may be used to ascertain the volume of fluid in the barrier 24 and/or fluid status within the tanks 28. Thus, a catastrophic spill of all liquid within the tank(s) 28 and precipitation may be retained in the reservoir 34. In one example, to allow water to flow out of the reservoir 34 while retaining hydrocarbons, oil, or other chemicals, an outflow (filter) system 36 may be provided. In the example of FIG. 1 and FIG. 2, an inlet 38a is provided through the barrier liner 24 in a low position where fluid within the reservoir 34 will flow via gravity to the inlet 38a and from there flow into a connecting pipe 40 to a discharge housing 42a. In one example the pipe 40 is below ground level 26 and the discharge housing 42a is open at or slightly above ground level to allow for outflow of fluid therefrom but below the upper edge 43 of the perimeter wall 30 at a lowest position so that liquid will not flow over the perimeter wall 30. A perforated or mesh grate may cover the discharge housing 42a as desired. Within the discharge housing 42a of one example is a filter 44a to allow passage of water and retain selected contaminates, (e.g. hydrocarbons). In one example, a valve 46a is positioned between the inlet 38a and the filter 44a to close the fluid conduit therebetween and allow for easy and clean removal and replacement of the filter 44a while retaining liquids in the reservoir 34.

Figure 3:
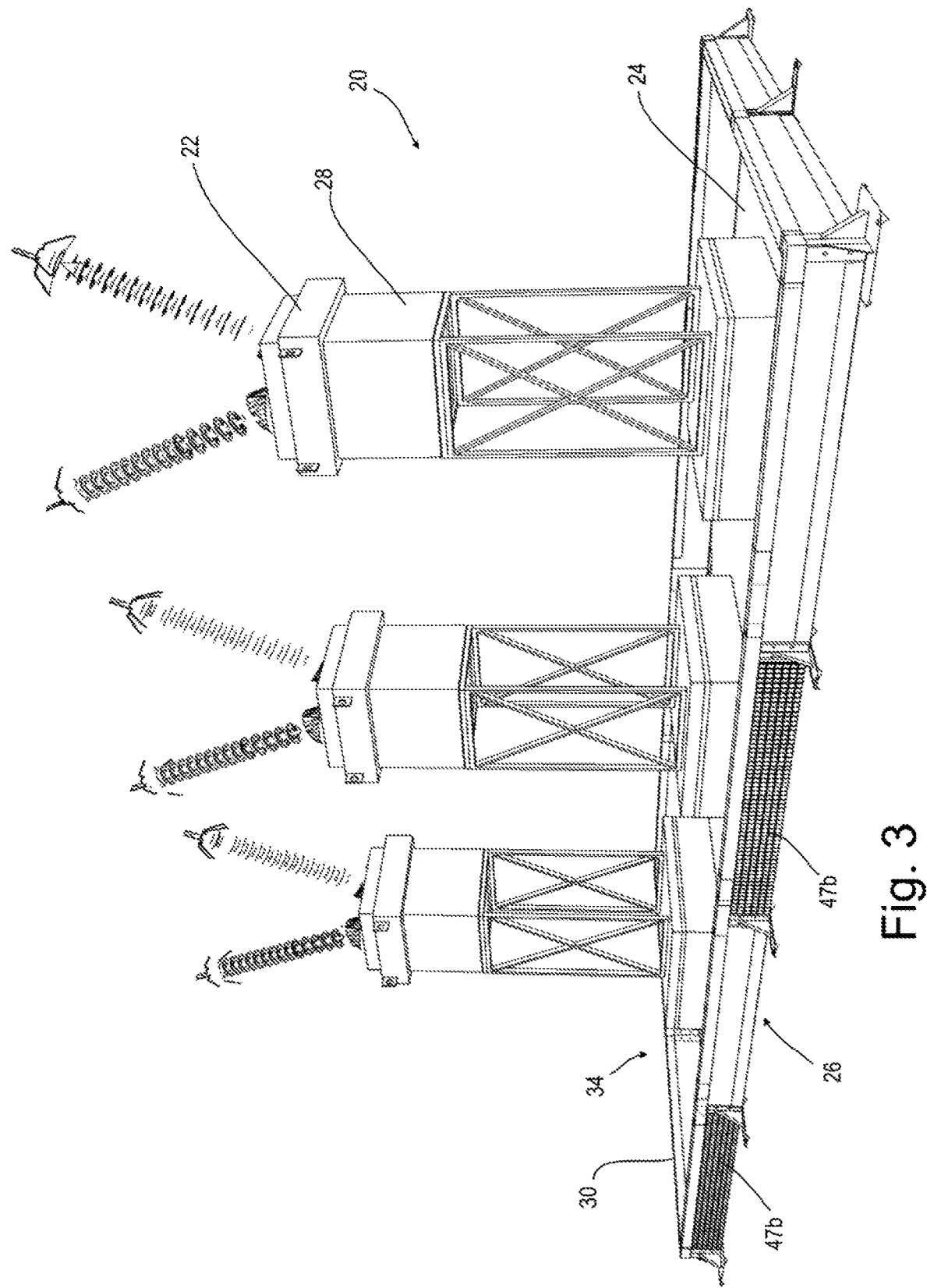
FIG. 3 is another example of the disclosed surface containment.

In the example shown in FIG. 3, and in FIG. 4a similar construction is shown where an inlet 38b is provided through the barrier liner 24 in a position through the perimeter wall 30 where fluid within the reservoir 34 will flow via gravity to the inlet 38 to a discharge housing 42b. A perforated or mesh grate may cover the discharge housing 42b. Within the discharge housing 42b is a filter 44a to allow passage of water and retain selected contaminates, (e.g. hydrocarbons). In one example, a valve 46b is positioned between the inlet 38b and the filter 44a allow for easy and clean removal and replacement of the filter 44a.

To form the perimeter wall 30, a plurality of wall panels 48 (e.g. 48a, 48b, 48c . . . ) are provided, connected via struts, connectors, or other methods and apparatus as will be described in more detail.

In one example, corners of the perimeter wall 30 comprise corner struts 50. These corner struts 50 as shown connect adjacent wall panels 48 and maintain the wall panels 48 in a vertical orientation. When a substantial amount of fluid is held within the reservoir 34, the horizontally outward pressure of a liquid filled barrier liner can be substantial, tending to force the wall panels 48 horizontally outward. This pressure may bias the tops of the wall panels 48 horizontally outward, potentially resulting in spillage of the liquid within the reservoir 34. In one example, the outside corner struts 50 as shown in FIG. 7 have a vertical component 52. The vertical component 52 of this example has u-shaped surfaces 54, 56 which in this example are shown at right angles to each other. The surfaces 54 and 56 configured to attach to separate wall panels 48 substantially at a right angle. The surfaces 54 and 56 of this example are U-shaped in cross section when viewed from above so as to contact front, end, and rear surfaces of each wall panel 48 and to add rigidity to the perimeter wall 30. In one example, the surfaces 54 and 56 are adhered, welded, brazed, or otherwise attached to the wall panels 48. In one example, the wall panels 48 and corner strut are bolted together. In one example, surfaces defining voids 58 are provided in the corner strut 50, wherein a mechanical fastener 59 such as a pin, bolt, screw, or rivet may pass through the voids 58 and the wall panel 48 to quickly and easily attach the wall panels 48 to the corner struts 50. In one example, the fasteners 59 are removable, allowing for easy deconstruction, removal, transportation, and storage of the surface containment system 20.

The outside corner struts 50 as shown in FIG. 7, and the inside corner struts 150 shown in FIG. 8 each comprise a base 60/152 attached to a lower end of the vertical component 52/154. The base 60/152 may be substantially planar, extending horizontally outward from the vertical component 52/154 so as to form a large surface area upon which the vertical component, attached wall panels, and attached barrier liner are supported and at the same time, the large base 60/152 provides stability from the vertical component 52/154, wall panels 48, barrier liner 24, and other weight from singing into the ground surface 26 due to weight pressure. The base 60/152 thus keeping the surface containment system 20 from settling into the ground or repositioning on the ground horizontally. The base 60/122/144/152 may be covered with dense material such as gravel, sand, rock, or combinations and equivalents thereof to add substantial weight to the horizontal footing (base 60/122/144/152) of the struts 50. This arrangement adds additional stability to the perimeter wall 30. The inside corner struts may be positioned as shown in FIG. 4. In such an arrangement as this, the pressure of fill and fluid within the perimeter wall 30 will be transferred outward to the attached wall sections. Thus, in such arrangements a brace (e.g. corner brace 63) shown in use with other struts may not be necessary.

In one example the inside corner struts 150 include wall panel receiving channels 156a/156b including voids 58/158 for passage of fasteners 59 as previously described. The base 152 of this example having ground-engaging corners 160. These corners are explained in more detail. and the base 152 of this example also has a large surface area within the circumference of the perimeter wall 30 when assembled.

In one example, the corner struts 50 also comprise braces 63 extending from the vertical component 52 to the base 60 and secured to each by welding, fasteners, adhering, etc. to add rigidity to the apparatus. In one example, each brace 63 extends in a direction directly opposing the opening of the u-shaped surface. Thus, the brace extends parallel to the wall panel 48 attached to the u-shaped surface. In another example, the brace 63 extends at an angle of between 20° and 70° from the vertical component 52 to the base 60. In one example, the brace extends at an angle of 45° from the vertical component 52 to the base 60.

As previously mentioned, some examples of the horizontal corners 64 of the base 60 comprise a ground penetrating corner 66 (66a-66d) which extends into the ground surface 26 and holds the corner strut 50 in place from sliding on the ground surface 26.

In some applications, it is desired to more securely maintain the position of the base 60 relative to ground 26, ground anchors for example ground anchors 68 are passed through the surfaces defining voids 70 in the base 60 into the ground surface 24. These ground anchors 68 securely hold the base 60 in position on the ground surface 24 while in place.

In the example shown in FIG. 14, the ground anchors 68 comprise a shaft 72 having a diameter 74 smaller than the diameter of the voids 66 so as to allow passage of the ground anchor 68 through the voids 70. Although the diameter 74 may be tapered or otherwise non-cylindrical. The ground anchors 68 in one example are between 10" and 18" long for secure attachment to the ground surface 24, with a narrower range of between 13" and 15" preferred to maximize a secure attachment without penetrating to the depth of any pipes, cables, or conduits, generally buried more than 14", generally more then 18" below the ground surface 24.

While such ground anchors 68 may be spikes, rods, helical coils concrete blocks, etc., in the example shown in FIG. 14, the ground anchor 68 also comprises threads 76 having a thread diameter 78 larger than the shaft diameter 74 so as to radially protrude from the shaft 72. The threads 76 may be helical in nature, such that rotation of the head 78 relative to the ground surface 24 linearly repositions the ground anchor 68 in direction 79 depending on the direction of rotation and the orientation of the helical threads. In one example rotation of the ground anchor 68 is accomplished by way of a tool such as a screwdriver, nut driver, drill, wrench, etc. having a surface configured to engage a tool engagement surface 80.

Generally, it will be desired that the head 78 of the ground anchor 68 has a larger diameter than the void 66 though which the shaft 72 passes. Thus, the shaft 72 will pass through the void 66, but the head 78 will not, thus holding the base 60 securely in position.

Looking to FIG. 15 is shown an end view of one example of a wall panel 48. In this example, the wall panel 48 comprises a core 82 with a first outer layer 84 and a second outer layer 86 on opposing exterior sides thereof. In one example, each assembled wall panel is 3" thick, (+/−1") including the first and second outer layers 84/86. In one example each assembled wall panel 48 is between 8" and 36" in height, with a length substantially more than that, often cut to length to fit the space requirements of the individual installation. In one example each wall panel has a height of between 11" and 13" in height. In one example, the core 82 comprises a structural foam panel such as polyurethane, polystyrene. The foam may be constructed with high fire-resistant properties. As the hydrocarbons within the tank(s) 28 may be flammable, having a fire-resistant perimeter wall 30 is greatly desired in many applications. In one example the first outer layer 84 and second outer layer 86 are each formed of sheet metal or other rigid materials designed to withstand the environmental conditions the perimeter wall will encounter including weather, impacts from users and vehicles, etc. In one application, testing has shown that a surface containment system 20 formed where the first outer layer 84 and second outer layer 86 are each formed of approximately 26-gauge sheet metal can withstand normal use and occasional impact normally found in such installations. In one example the outer layers 84 and 86 are formed Aluminum-Zinc alloy coated sheet metal, to provide corrosion and heat resistance to the sheet metal panels. These outer layers 84/86 and the core 82 in one example are bolted, screwed, adhered, or otherwise fastened to the struts (e.g. corner strut 50). In one example, the wall panels 48 are capped on their top edge and bottom edge with a flashing as described below. In one example the flashing is also comprised of sheet metal, such as the same material as the outer layers 84/86. In one example the thickness of the flashing material is also formed substantially of 24-gauge material to balance structure, weight, durability, and cost while providing a secure perimeter wall which is expected to last for years with minimal maintenance. In one example the flashing material is coated with a thin polyurethane layer (which may also have fire resistant properties).

In one installation, where the equipment 22 is to be placed on pilings, or concrete pad, the barrier liner 24 of one example is installed inside of and sealed around the piling, ground, or concrete pad and is installed on the perimeter walls 30 to form the reservoir 34 prior to placement of the equipment 22. In another example, such as when pilings 87 are in place or it is otherwise not possible to position the barrier liner 24 prior to installation of the pilings 87 or equipment 22, holes may be made in the barrier liner 24 there through which the pilings 87 extend. The barrier liner 24 may then be sealed to the exterior of the pilings 87 maintaining the fluid seal such that fluids cannot leak through or past the barrier liner 24 to the environment.

In this and other installations, the perimeter wall 30 may horizontally encircle the equipment 22 to ensure containment of any leaking fluids, but at a vertical position below or substantially below the equipment 22. In other terms, the perimeter wall 30 has a vertically upper edge (upper flashing) which may be lower than the upper edge of the equipment, less than or equal to the upper lower edge of the equipment, less than ½ the height of the equipment, etc.

In one example, the upper flashing 88 may be colored to contract with the other components, (e.g. International Safety Orange, or reflective light materials). By so coloring the upper flashing 88, damage and injury are lessened in that damaging contact with equipment, personnel, and vehicles is reduced.

One example of an upper flashing 88 is shown in FIG. 10. This example having a u-shaped inner surface 90 configured to be in contact with the other components of the wall panel 48. In the example shown in FIG. 15, this surface 90 is in contact with the $1^{st}$ outer layer 84, core 82, and $2^{nd}$ outer layer 86. The upper flashing 88 as so arranged forming an upper edge or surface of the wall panel 48. In one example the upper flashing 88 is comprised of sheet metal. In one example the thickness of the upper flashing material is substantially 24-gauge. In one example the upper flashing material is also polyurethane coated (the coating may also have fire resistant properties).

One example of a bottom flashing 92 is shown in FIG. 9. This example having a u-shaped inner surface 94. This inner surface 94 may be configured to be in contact with and sealed to the $1^{st}$ outer layer 84, core 82, and $2^{nd}$ outer layer 86. This assembly thus forming a lower edge of the wall panel 48. In one example the lower flashing 92 is comprised of sheet metal similar to the other components. In one example the thickness of the lower flashing material is substantially 24-gauge. This lower flashing material may also be polyurethane coated (the coating composition may also have fire resistant properties).

Figure 5:
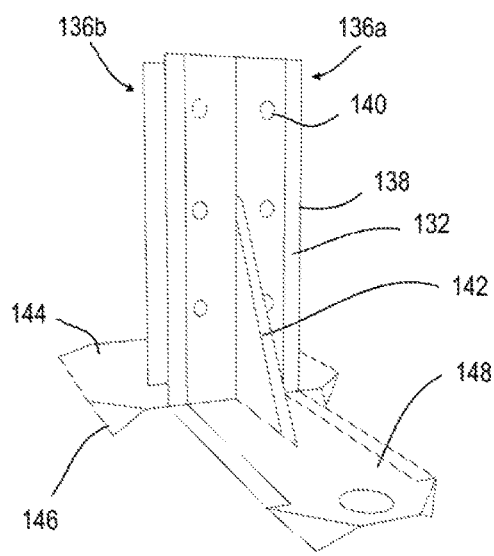
FIG. 5 is a connector-strut component of the example shown in FIG. 3.

In some applications, the material available for the wall panel 48 including upper flashing 88 and/or lower flashing 92 may be provided in lengths shorter than the final length of a perimeter wall section. In such cases, a connector strut 132 may be used. The connector strut as shown in FIG. 5 having horizontally opposed u-shaped channels 136a, 136b formed by the surfaces of a vertical component 138. The vertical component 138 having surfaces defining voids 140 through which pass fasteners 59 as previously described for attachment of the connector strut 132 to horizontally opposed wall panels 48. The connector struts 132 in some applications also utilizing a brace 142. The brace 142 attached on the exterior surface of the vertical component 138. The brace 142 extending to a base 144 to increase stability of the surface containment system 20, such as in a partially filled condition. The base 144 in one example having a large surface area under barrier liner 24. The ground anchors 68 previously described, or sand, gravel or equivalent weight may be placed on the base 144 to secure the connector strut 132 in place on the ground surface 26. The base 144 of this example having ground engaging corners 146 as previously described, as well as voids 148 though which may pass ground anchors 68.

It may be desired to provide a seal between an upper flashing 88 or lower flashing 92 and a corner flashing 98, tee flashing 100, or other structure. Thus, a transition (joiner) flashing 102 having in one example a u-shaped inner surface 104 large enough to fit over the upper flashing 88 or lower flashing 92 may be desired to span adjacent components. In one example, where the transition flashing 102 also spans across a corner flashing 98, tee flashing 100, or other structure, the inner width of the transition flashing 102 should overlap all of these structures.

In one example a joiner flashing 102 is used every length of wall panel 48 to ensure a smooth transition between sections and keep rain out of the wall panels 48. In one example the joiner flashing is ⅛ of an inch wider than the upper flashing 88 or lower flashing 92 and a corner flashing 98, tee flashing 100, or other structure to allow spacing for an adhesive or sealant and to ensure a snug sealable connection. In one example, wall sections are provided in 8' lengths for ease in distribution and storage.

Figure 6:
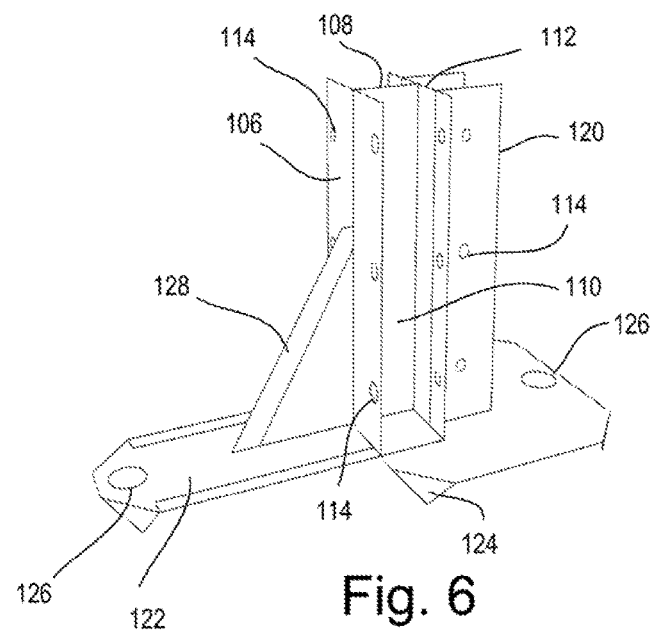
FIG. 6 is the tee-strut component of FIG. 5 from another angle.

Looking to FIG. 4, and FIG. 6 is shown one example of a tee-strut 106. The tee-strut 106 is similar to the corner strut 50 but configured with three u-shaped wall panel receiving surfaces 108, 110, 112 in one example are welded together. These surfaces 108, 110, 112 receive wall panels 48. To complete the assembly, surfaces defining voids 114 there though are provided for passage of fasteners 59 to secure the tee-strut 106 to wall panels 48 and/or grate panels 116b as shown in FIG. 4 where two panels are parallel and aligned, and the third panel (48e in this example) is perpendicular thereto. In this example the tee-strut 106, like the corner strut 50, also comprises a vertical component 120 having the surfaces 108-112 with a void 114 there through. The vertical component 120 of this example is attached to a base 122 which rests upon the ground 26 surface and supports the attached wall sections 48 and other attached components.

The tee-strut 106 of this example also having ground penetrating corners 124 on at least one exterior corner configured to secure the tee strut 106 in place. Ground anchors 68 can be installed through voids 126 as previously discussed.

The tee-strut 106 of this example also comprising a brace 128 equivalent in form and structure to the brace 63 previously described.

In the example shown in FIG. 4, showing a corner region of the surface containment system 20, a plurality of tee-struts 106, a plurality of grate panels 116, a plurality of wall panels 48, a plurality of outside corner struts 50, a plurality of inside corner struts 150 are assembled with fasteners 118 to form a discharge housing 42b as previously described.

When the barrier liner 24 cannot be formed of a single monolithic structure (seamless), any seams of the barrier liner 24 can be sealed with a heat gun, polyvinyl welder, specialize glues, or combination s thereof. Both methods may require a minimum of a 2" overlap and the vinyl should be dry and clean, free from dust and dirt. Aerosol cleaner may be used on the panel edges prior to connection for proper seam preparation. Installers should clean and dry both edges of the vinyl to be joined. Trimming excess vinyl at the seams will make seaming easier and pre-marking the seam overlap with a line will keep the seam straight, uniform, and avoids wrinkles.

In one example, sealant may also be used between components such as between the wall panels 48 and flashing 88/92, between core 82 and outer layers 82/84, between wall panels 48 and struts 50/106, etc. Silicone sealant having well known fluid sealing and heat resistant properties may be used.

In one example, the perimeter wall extends 12" to 36" above the ground 26 to provide an adequate barrier without undue size constraints.

Figure 17:
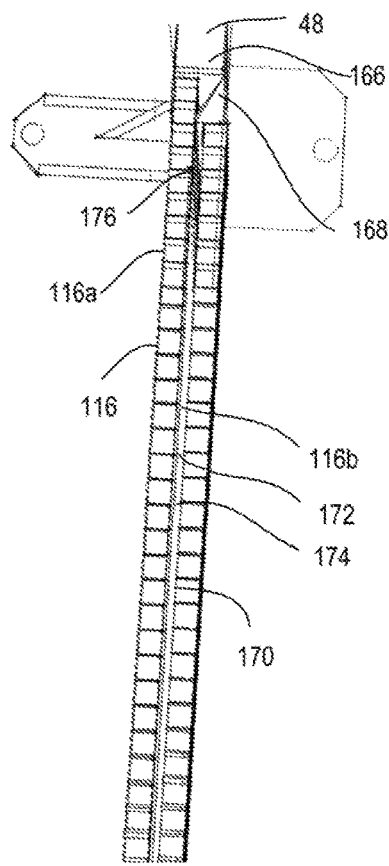
FIG. 17 is a top isometric view of the example shown in FIG. 16.
Figure 18:
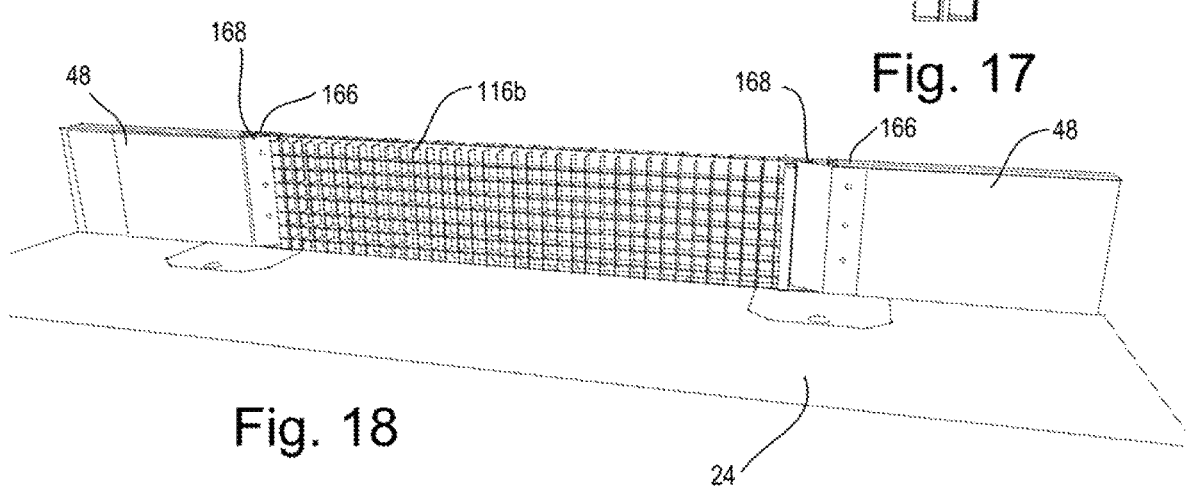
FIG. 18 is a front perspective view of the example shown in FIG. 16.

FIGS. 16-18 show a prefilter assembly 162 including a pair of prefilter struts 164 on either lateral side of an exit grate panel 116. These prefilter struts 164 are formed similarly to the other struts previously, with a u-shaped channel 166 configured to receive an end of a wall panel 48. In the example, the prefilter struts 164 comprise a vertically extending outwardly angled portion 168 on the inner side thereof. This angled surface extends from the barrier wall 48 to an outer grate panel 116a so as to form a smooth transition of the barrier liner 24 from the barrier wall 48 to the inner surface 170 of a prefilter 172. The prefilter 172 comprising a screen, fibrous filter, or other composition pressed at the ends between the angled portions 168 and the inner surface e of the grate panel 116. This arrangement holding the prefilter 172 in place.

The barrier wall 48 will generally not fully overlap the grate panel 116 such that fluids may flow through the grate panel 116 to a filer assembly as previously described. The prefilter assembly 162 thus removes most solid contaminates such as leaves, twigs, hail, plant matter, etc. which may otherwise hinder effectiveness of the filter 44.

To protect the prefilter panel 172, an inner grate 116b may be provided inward of the outer grate 116a and prefilter panel 172. This inner grate 116b protecting the prefilter panel 172.

In one example, the prefilter assembly 162 is configured with the inner grate 116b and outer grate 116a fitted to the prefilter struts 164 in such a way that a gap 174 remains between the inner grate 116b and outer grate 116a. this gap in one example is ½"±¼" to allow for easy insertion and removal of the prefilter panel 172 for cleaning and replacement. In one example, this may be accomplished by way of a spacer 176.

In one example, the outer grate 116a has a grate spacing of 1.5"±¼" while the inner grate 116b has a grate spacing of 1.0"±¼".

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A surface containment wall support system configured to contain liquid contaminates escaping from a vessel, the containment system comprising:
   a water and oil impermeable barrier liner resting on a ground surface;
   the barrier liner formed of a thin film configured to conform to the ground surface;
   a perimeter wall
   horizontally surrounding the vessel;
   the perimeter wall extending vertically above the ground surface;
   the perimeter wall vertically supporting a portion of the barrier liner above the ground surface to form a containment reservoir configured to be positioned below the vessel and horizontally encircle the vessel such that any fluids leaking form the vessel will be contained in the barrier liner;
   at least one fluid conduit through the barrier liner;
   the fluid conduit comprising a hydrocarbon filter;
   the fluid conduit configured to allow water to pass from the reservoir through the fluid conduit to the hydrocarbon filter;
   the perimeter wall comprising a plurality of wall panels;
   adjacent wall panels forming the reservoir connected by way of struts; and
   the struts comprising a vertical component connected to the wall panels and a base component resting on the ground surface.

2. The surface containment wall support system as recited in claim 1, wherein the fluid conduit comprises a valve configured to restrict flow through the fluid conduit between the barrier liner and the hydrocarbon filter.

3. The surface containment wall support system as recited in claim 1 wherein the hydrocarbon filter is a hydrocarbon solidifying filter.

4. The surface containment wall support system as recited in claim 1 wherein each base component of each strut comprises a ground engaging cleat configured to penetrate the ground and maintain position of the strut.

5. The surface containment wall support system as recited in claim 1 wherein:
   each base component of each strut comprises at least one surface defining a void vertically therethrough;
   the surface defining a void configured to allow passage of the shaft of a ground-engaging anchor and not allow passage of a head of the ground-engaging anchor.

6. The surface containment wall support system as recited in claim 1 further comprising a prefilter assembly positioned between the barrier liner and the hydrocarbon filter.

7. The surface containment wall support system as recited in claim 1 wherein the barrier liner consists essentially of polyvinyl.

8. The surface containment wall support system as recited in claim 1 wherein the barrier liner comprises polyvinyl and is between 6 mils (0.006") to 250 mils (0.250") thick.

9. The surface containment wall support system as recited in claim 1 wherein the barrier liner comprises polyvinyl and is between 20 and 50 mils thick.

10. A surface containment wall support system configured to contain liquid contaminates escaping from a vessel, the containment system comprising:
    a water and oil impermeable barrier liner positioned on a ground surface;
    a perimeter wall horizontally surrounding the vessel;
    the perimeter wall extending vertically above the ground surface;
    the perimeter wall supporting a portion of the barrier liner so as to form a containment reservoir configured to be positioned below the vessel and horizontally encircle the vessel such that any fluids leaking form the vessel will be contained in the barrier liner;
    at least one fluid conduit through the barrier liner;
    the fluid conduit comprising a hydrocarbon filter;
    the fluid conduit configured to allow water to pass by way of gravity from the reservoir through the barrier liner to the hydrocarbon filter;
    the perimeter wall comprising a plurality of wall panels;
    adjacent wall panels forming the reservoir connected by way of struts;
    the struts comprising a vertical component connected to the wall panels and a base component resting on the ground surface;
    each wall panel comprises a first outer layer, second outer layer, a core between the first outer layer and second outer layer;
    each wall panel comprises a top flashing attached to an upper edge of the wall panel, the top flashing overlaying a top edge of the first outer layer, the core, and the second outer layer, a portion of an outer surface of the first outer layer, and second outer layer.

11. The surface containment wall support system as recited in claim 10 wherein: each wall panel comprises a bottom flashing attached to a lower edge of the wall panel and overlaying a bottom edge of the first outer layer, core, and second outer layer, a portion of the outer surface of the first outer layer and a portion of the outer surface second outer layer.

12. A surface containment wall support system configured to contain liquid contaminates escaping from a vessel, the containment system comprising:
    a water and oil impermeable barrier liner positioned on a ground surface, the barrier liner formed of a thin film configured to conform to the ground surface;
    the barrier liner forming a perimeter wall horizontally surrounding the vessel;
    the perimeter wall extending vertically above the ground surface;
    the perimeter wall supporting a portion of the barrier liner forms a containment reservoir such that any fluids leaking form the vessel are contained in the barrier liner;
    the perimeter wall comprising a plurality of wall panels;
    adjacent wall panels forming the reservoir connected by way of struts;
    the struts comprising a vertical component connected to the wall panels and a base component resting on the ground surface;
    each wall panel comprises a first outer layer, second outer layer, a core between the first outer layer and second outer layer;
    each wall panel comprises a top flashing attached to an upper edge of the wall panel, the top flashing overlaying a top edge of the first outer layer, the core, and the second outer layer, a portion of an outer surface of the first outer layer, and second outer layer.

* * * * *